March 4, 1958 O. P. DE LOE 2,825,075
TRANSFER MEANS MOVABLE TOWARD AND AWAY FROM
FACE OF DIE BLOCK DURING OSCILLATION
Filed Aug. 29, 1955 4 Sheets-Sheet 4

INVENTOR
Olivier Paul De Loe
BY Rockwell Bartholow
ATTORNEYS

2,825,075

TRANSFER MEANS MOVABLE TOWARD AND AWAY FROM FACE OF DIE BLOCK DURING OSCILLATION

Oliver Paul De Loe, Detroit, Mich., assignor to The Waterbury Farrel Foundry & Machine Company, Waterbury, Conn., a corporation of Connecticut Application August 29, 1955, Serial No. 531,182

15 Claims. (Cl. 10—12)

This invention relates to transfer mechanism and more particularly to a transfer mechanism which may be employed for transferring a workpiece from one station or die to another in a fabricating machine having a number of operating stations or dies for performing operations upon a workpiece or blank.

This invention particularly relates to transfer mechanism of such a character that the workpieces may, if desired, be turned or rotated through an angle of 180 degrees during the transfer from one station to another so that the die face of the blank at one station becomes the punch face at the next station.

In the device illustrated transfer fingers are supported upon rotatably mounted spindles so that these fingers may be rotated during the transfer operation. As it is desirable that the transfer fingers be closely adjacent the faces of the dies at the time of receiving or delivering a blank, it is necessary to move the fingers away from the dies in order that they will have room for the rotating or turning movement without fouling the faces of the dies or die block.

To this end a carrier is provided in which are rotatably mounted the spindles which carry the transfer fingers, and means are provided to oscillate this carrier in a plane substantially parallel to that of the face of the die block (a vertical plane as shown in the drawings), and additional means are provided to move this carrier in a direction away from the face of the die blocks during its oscillating movement which, as shown, is in a direction transverse to the oscillating movement.

At the same time means are provided to rotate the spindles during both movements of the carrier, i. e., during the oscillating movement in a vertical plane and also during its movement toward and from the face of the die blocks.

One object of the present invention is to provide a new and improved transfer mechanism of relatively simple form which will have provision for rotating the blanks or workpieces, if desired, between succeeding stations or dies on the machine.

A still further object of the invention is to provide a transfer mechanism comprising an oscillatable carrier having spindles rotatably mounted therein upon the lower ends of which the transfer fingers are carried, together with means for moving said carrier in a direction toward and from the face of the die block as required, while at the same time rotating the spindles during the transfer of the workpieces from one station to another.

A still further object of the invention is to provide a transfer mechanism of relatively simple form which will effectively transfer a workpiece from one station to another in a work-processing machine having a plurality of dies or operating stations, while at the same time having provision for rotating the workpieces or blanks during the transfer operation so that the die face of the blank at one station becomes the punch face at the next succeeding station.

To these and other ends the invention consists in the novel features and combinations of parts to be hereinafter described and claimed.

Figure 1:
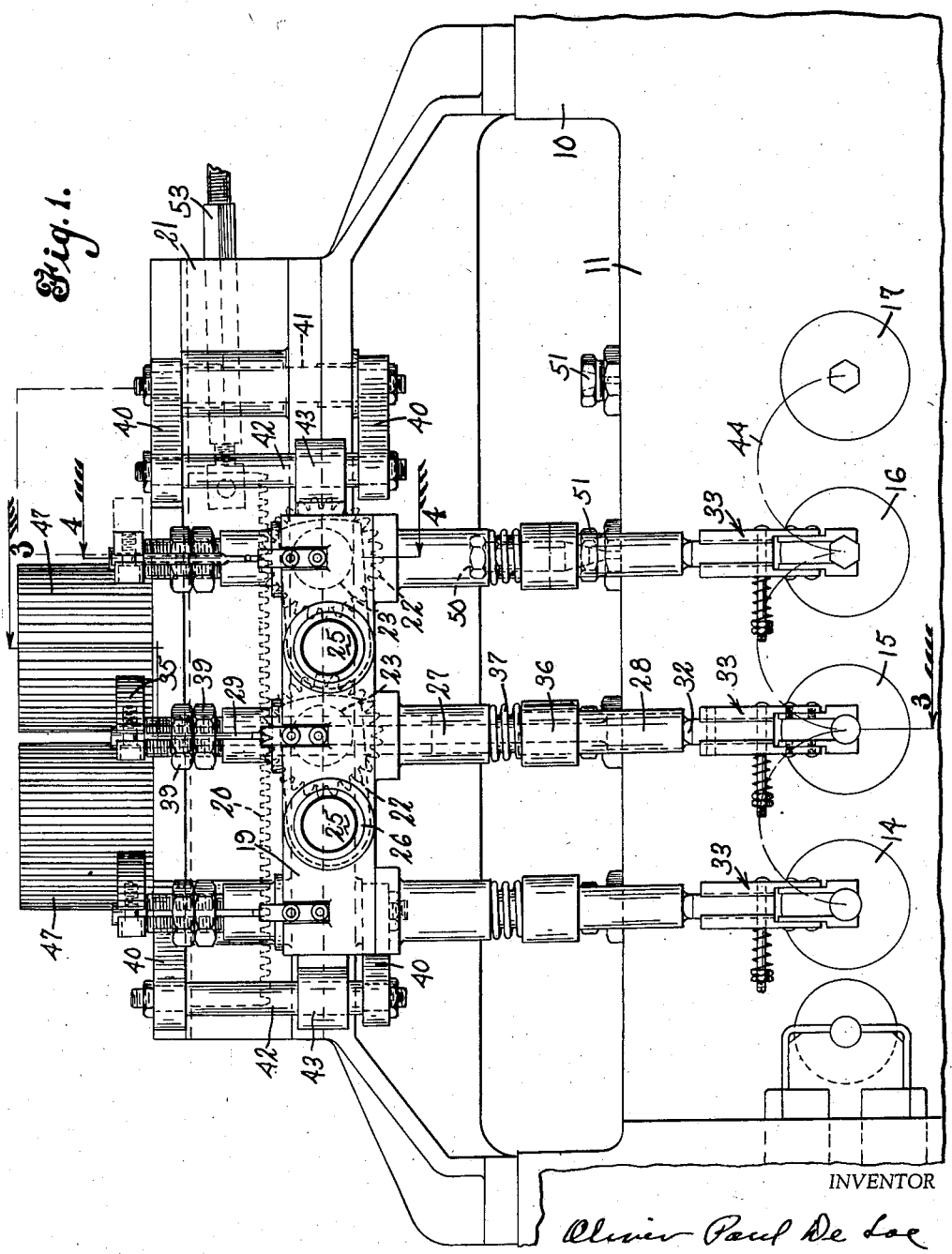
Fig. 1 is a front elevational view of a portion of a nut former or like machine embodying my invention.

To illustrate a preferred embodiment of my invention I have shown in the drawings a machine for the manufacture of bolts, nuts, rivets or the like, comprising a main frame 10 having a die block 11 within which are carried a plurality of dies 14, 15, 16 and 17, the dies being held rigidly in the die block, and the face of the dies being normally flush with the face of the die block.

A carrier or carrying head 19 is provided by which the transfer fingers and associated mechanism are carried, and means are provided to oscillate this carrier so that the transfer fingers are moved in an arcuate path across the face of the die block from one die to the next, as will be described more particularly hereinafter.

Figure 2:
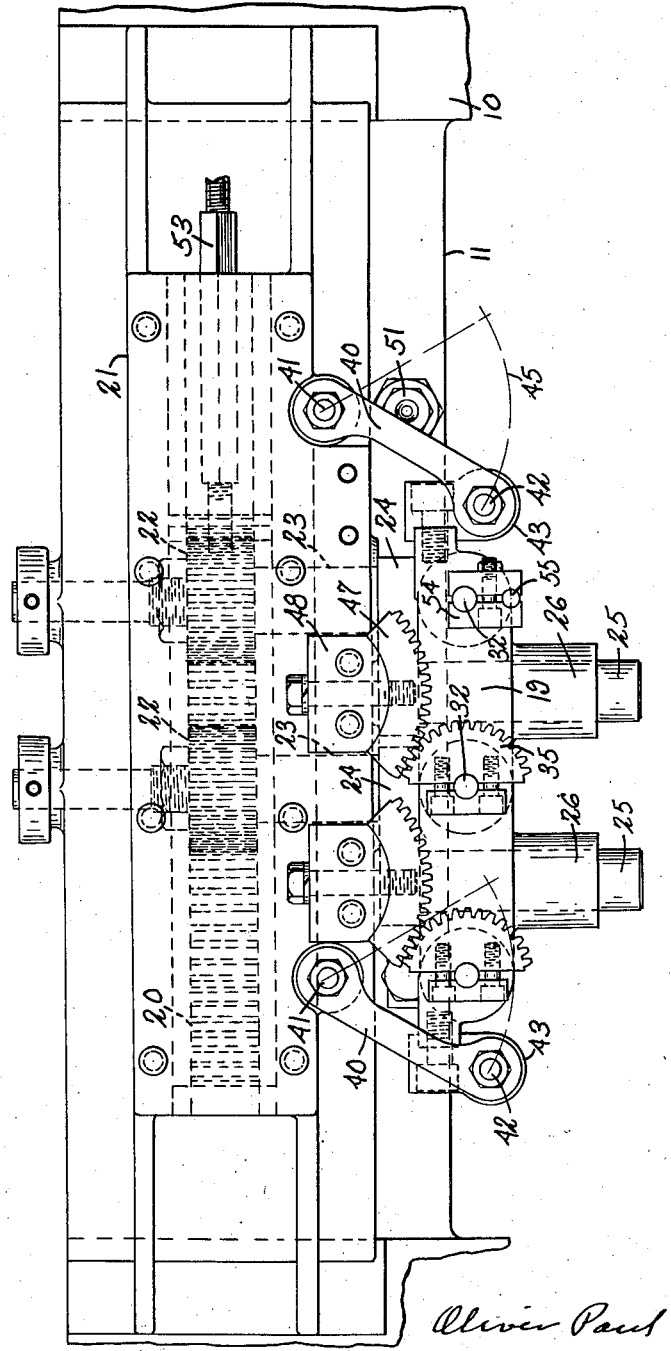
Fig. 2 is a top plan view of the mechanism shown in Fig. 1.
Figure 3:
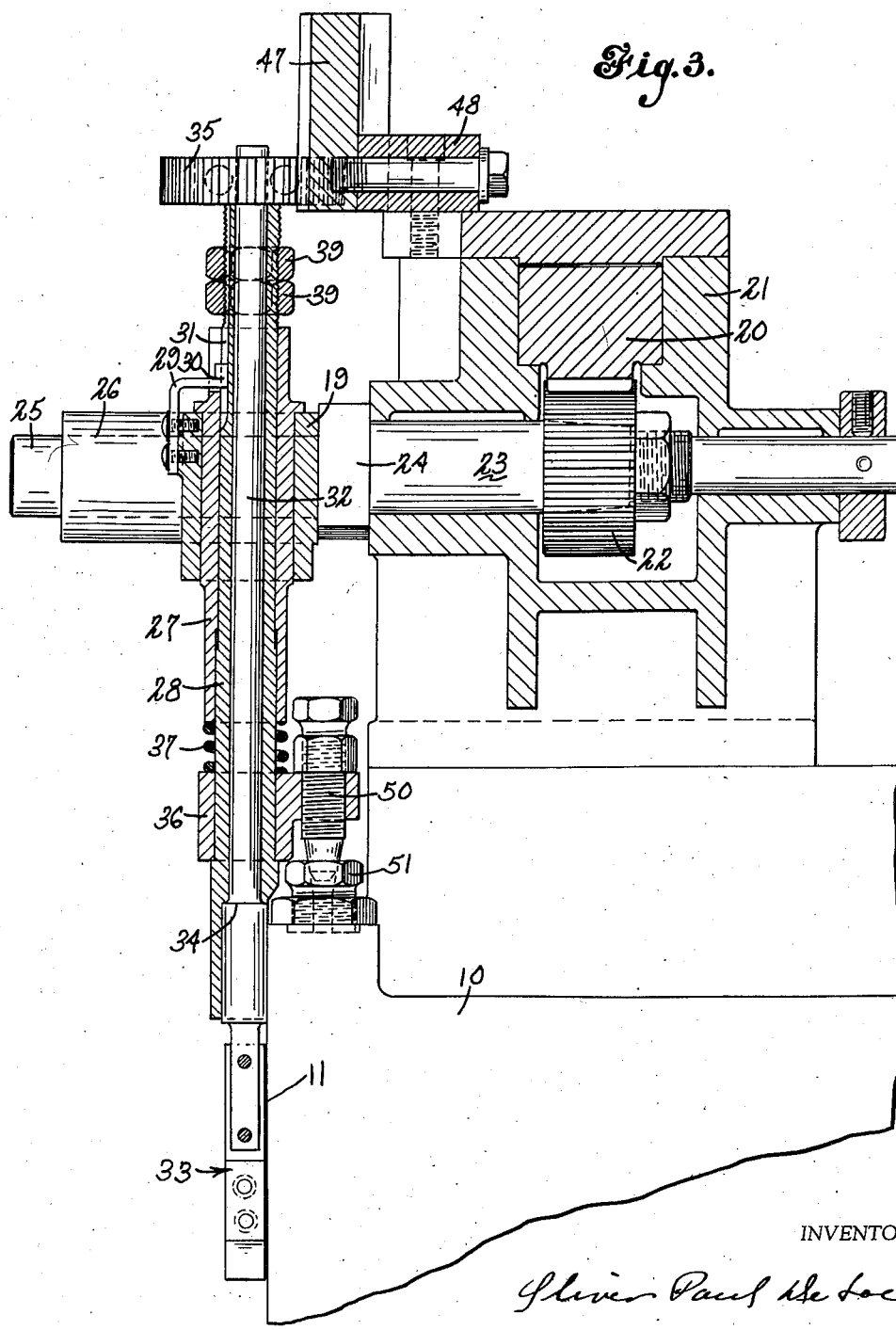
Fig. 3 is a sectional view on line 3—3 of Fig. 1.
Figure 6:
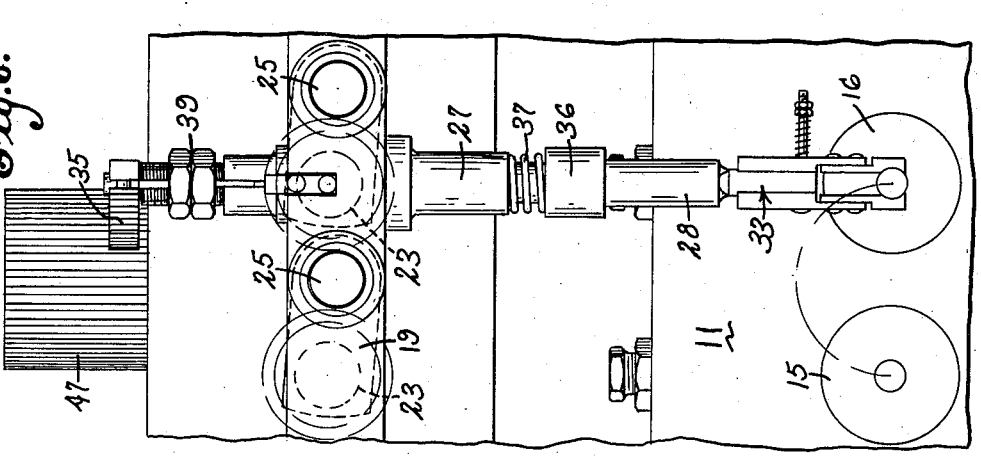
Fig. 6 is a view similar to Fig. 5 showing the position of the transfer mechanism at the completion of a transfer operation.

The mechanism for oscillating the carrier head 19 is substantially the same as that shown in the Wilcox Patent No. 1,982,460, so it need not be described in detail hereinafter. It will suffice to say that, as shown in Fig. 3, a rack 20 is secured in a bracket 21 which is fixed with respect to the frame of the machine, and the teeth of the rack mesh with the teeth of pinions 22, each secured upon a crank shaft 23 to the forward end of which is secured a crank 24. A crank pin 25 is secured to the crank, which crank pin projects rotatably and slidably through a housing or bushing 26 formed with or rigidly secured to the carrier head 19. As is shown in Figs. 1 and 2 of the drawings, two of these crank mechanisms are provided to oscillate the carrier head although the number thereof may be varied if desired. As the carrier head moves outwardly away from the dies, as hereinafter explained, these bushings will slide outwardly on the crank pins.

Within the carrier head 19, as shown more especially in Fig. 3, is rigidly mounted an outer bushing 27, and within this outer bushing is slidably mounted a slide bushing 28. While the slide bushing 28 is slidable vertically in the outer bushing, it is restrained from rotation therein by a key 29 secured to the carrier head and provided with a head 30 projecting into a longitudinal keyway 31 in the bushing 28. The keyway is of sufficient length to permit sliding movements of the slide bushing.

Within the slide bushing is rotatably mounted a spindle 32 carrying at its lower end the transfer fingers designated generally by the numeral 33. As these transfer fingers may be of the usual form, further description thereof is not required. It will be noted that the spindle 32 is provided with a shoulder 34 which fits against a mating shoulder in the slide bushing 28 to prevent relative movement in one direction of the spindle in the bushing, and fixed to the upper end of the spindle is a gear segment 35 which restrains movement of the spindle in the other direction, so that while the spindle is permitted rotative movement within the bushing 28, it is prevented from longitudinal movement therein.

Figure 5:
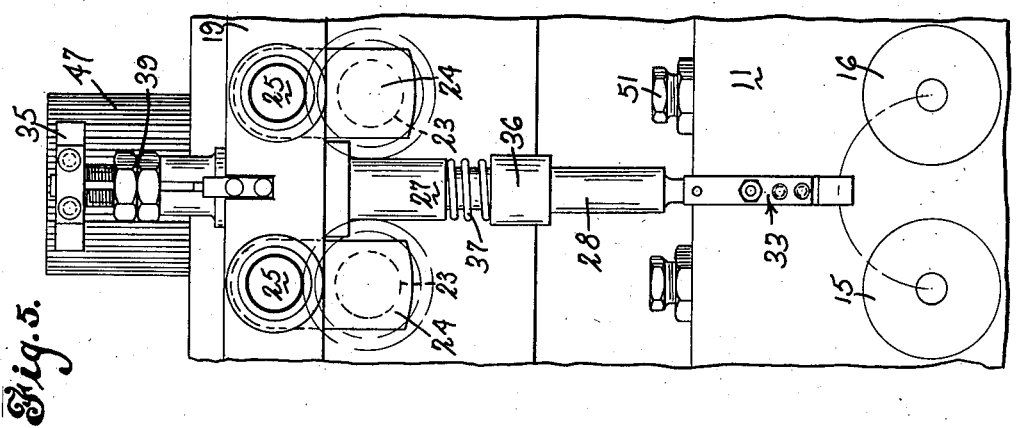
Fig. 5 is a front elevational view of a portion of the machine showing the position of the transfer fingers at an intermediate point in the transfer operation.

A block 36 is secured to the slide bushing 28, and a compression spring 37 acts between the block and the lower end of the outer bushing 27 to normally urge the slide bushing 28 downwardly, as shown in Fig. 3, this movement being limited by the stop nuts 39 secured to the upper end of the bushing 28 so that normally, as shown, for example, in Fig. 5, the lower of the nuts 39 rests against the upper edge of the outer bushing 27.

As stated, it is sometimes desired to provide means for rotating the spindles 32 and fingers 33 during the transfer operation, and it is, therefore, necessary to move these fingers in a direction away from the die block for they normally stand in close relation to the face of the block, as shown in Fig. 3. To this end links 40 are pivotally connected to the frame of the machine and to the carrier head 19, as will now be explained. As shown more especially in Figs. 1 and 2, pivot pins or shafts 41 are rotatably mounted in the bracket 21 which, as will be remembered, is fixed with respect to the frame of the machine and to the upper and lower ends of these pivot pins the links 40 are secured. The outer ends of the links 40 are secured to pivot pins or shafts 42 and upon these shafts are slidably mounted eyes 43 secured to the carrier head 19. This permits the carrier head to move vertically, as shown in Fig. 1, with respect to the shafts 42, and it will be remembered that the carrier is oscillated in a vertical plane by the cranks 24 while the links are not permitted such movement with respect to the frame of the machine. As shown in Figs. 1 and 2, two pairs of the links 40 are provided, one pair being at each end of the carrier.

From the above description, it will be seen that as the carrier is moved across the face of the die block, as shown by the dotted lines 44 of Fig. 1, the shafts 42 at the outer ends of the links 40 are moved through the arcuate path shown at 45 in Fig. 2, so that the carrier which is secured to the shafts 42 will be moved in an arcuate path toward and from the face of the die block, it being most remote from the die block at the center of its arcuate movement. This movement of the carrier away from the die block moves the transfer fingers 33 away from the face of the block so that the fingers may be rotated.

The means for rotating the fingers comprises a gear segment 47 of arcuate form, this gear segment being fixed with respect to the bracket 21 by means of the intermediate block 48 which is secured to the segment and to the bracket. It will be understood that one of the gear segments 47 is provided for each of the spindles which it is desired to rotate. Also, as shown in Figs. 1 and 3, the faces of the gear segments 47 are of considerable width due to the fact that in its oscillating movement the head 19 and, therefore, the gear segments 35 travel vertically to a considerable extent in their movements from one station or die to the next. This extra width of the face of the segment 47 permits the teeth of the two segments to be in engagement at all times during operation of the machine so as to effect rotating movements of the spindles 32. It may here be noted that while I have employed gear segments or parts of gears 35 and 47, these members may be complete gears, if desired, but such is not necessary as only a partial rotation of the spindle 32 is required.

Means are also provided for limiting the end position of the transfer or gripping fingers so that they will always be stopped in the proper position opposite the openings in the dies. It is arranged that the cranks 24 move through an angle slightly greater than 180 degrees and, as has been previously stated, a sliding movement is provided between the slide bushing 28 and the outer bushing 27 so that the slide bushing may be stopped at the proper point while permitting a slight overtravel of the cranks and outer bushing 27. To this end an adjustable stop screw 50 is mounted in the block 36 which is fixed to the slide bushing, this screw being adapted to enter a cooperating bushing 51 secured to the die block on the frame of the machine. During operation when the carrier comes to a point adjacent the end of its travel, the adjusting screw 50 seats in the bushing 51 and checks further movement of the slide bushing 28 and the transfer fingers. This will, however, permit slight overtravel of the cranks and outer bushing 27 compressing the spring 37. The head 30 of the key 29 permits such movement as it is permitted to travel in the keyway 31.

The crank shaft 23 is oscillated by means of reciprocating movement of the rack 20, which rack may be reciprocated by the link 53 (Fig. 1), the link being actuated by the means shown in United States Patent No. 1,982,460 previously referred to.

Figure 4:
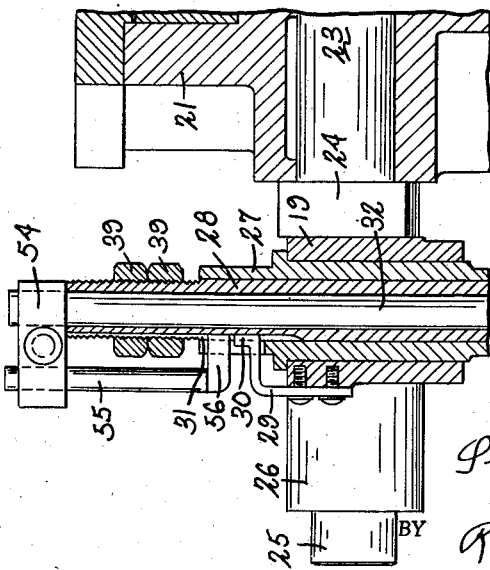
Fig. 4 is a fragmentary sectional view on line 4—4 of Fig. 1.

It may sometimes be desired that the blanks be transferred from one station to the next without rotation thereof. In this case it is only necessary to remove the gear segment 35 from the spindle 32 and secure on this spindle the block 54 shown in Fig. 4. A key member 55 secured to the block and having an end portion 56 entering the keyway 31 in the slide bushing 28 prevents rotation of the spindle relatively to the bushing. With this arrangement there will no longer be any connection between the spindle 32 and the gear segment 47, and hence the transfer operation will be effected without rotation of the spindle.

While I have shown and described a preferred embodiment of my invention, it will be understood that it is not to be limited to all of the details shown, but is capable of modification and variation within the spirit of the invention and within the scope of the claims.

What I claim is:

1. In a machine of the character described, a frame, a die block on the frame having a plurality of dies in its face, means for transferring a blank across the face of the block from one die to another, said means comprising a carrier member, gripping fingers carried thereby, means for oscillating said carrier member across the face of the die block, and means for simultaneously moving said carrier member in an arcuate path and in a direction away from the face of the die block and means for rotating said fingers during said oscillation, said last-named means comprising spindles rotatably mounted on the carrier by which the fingers are carried and arcuate intermashing gear segments on said spindles and frame.

2. In a machine of the character described, a frame, a die block on the frame having a plurality of dies in its face disposed in a substantially horizontal line, means for transferring a blank across the face of the block from one die to another, said means comprising a carrier member, gripping fingers carried thereby, means for oscillating said carrier member across the face of the die block, and means for simultaneously moving said carrier member in an arcuate path and in a direction away from the face of the die block and means for rotating said fingers during said oscillation, said carrier-moving means including a link pivoted to the frame and to the carrier member on vertical axes substantially parallel to the face of the die block.

3. In a machine of the character described, a frame, a die block on the frame having a plurality of dies in its face, means for transferring a blank across the face of the block from one die to another, said means comprising a carrier member, gripping fingers carried thereby, means for oscillating said carrier member across the face of the die block in a generally vertical plane, means for simultaneously moving said carrier member in an arcuate path and in a direction away from the face of the die block and for rotating said fingers during said oscillation, said means including a spindle rotatably mounted in the carrier member on the lower end of which spindle said fingers are carried, and intermeshing gear segments rigidly mounted on said spindle and frame, one of said gear segments being of greater width than the other to permit meshing of the teeth of the segments during oscillation of the carrier.

4. In a machine of the character described, a frame, a die block on the frame having a plurality of dies in its face, said dies being arranged in a substantially horizontal line, means for transferring a blank across the face of the block from one die to another, said means comprising a carrier member, gripping fingers carried thereby, means for oscillating said carrier member across the face of the die block, means for simultaneously moving said carrier member in a direction away from the face of the die block and means for rotating said fingers during said oscillation, said carrier-moving means including links pivoted to the frame and to the carrier member on vertical axes substantially parallel to the face of the die block, and also including a spindle rotatably mounted in the carrier member on one end of which said fingers are carried and intermeshing gear segments rigidly mounted on said spindle and frame.

5. In a machine of the character described, a frame, a die block on the frame having a plurality of dies in its face, means for transferring a blank across the face of the block from one die to another, said means comprising a carrier member, gripping fingers carried thereby, means slidably connected to the carrier member for oscillating it across the face of the die block, means for simultaneously moving said carrier member in a direction away from the face of the die block and means for rotating said fingers during said oscillation, said carrier-moving means including links pivoted to the frame and to the carrier member on axes substantially parallel to the face of the die block, and said finger-rotating means including a spindle rotatably mounted in the carrier member on one end of which said fingers are carried, intermeshing gear segments on said spindle and frame, and the segment on the frame being of arcuate form and its pitch radius being substantially equal to the length of said link.

6. In a machine of the character described, a frame, a die block on the frame having a plurality of dies in its face disposed in substantially horizontal alignment, means for transferring a blank across the face of the block from one die to another, said means comprising a carrier member, gripping fingers carried thereby, means for oscillating said carrier member across the face of the die block, means for simultaneously moving said carrier member in a direction away from the face of the die block and means for rotating said fingers during said oscillation, said carrier-moving means including a link pivoted to the frame and to the carrier member on vertical axes substantially parallel to the face of the die block, and said carrier member being connected to said link to permit relative movement therebetween in a vertical direction substantially parallel to the plane of the face of the die block.

7. In a machine of the character described, a frame, a die block on the frame having a plurality of dies in its face, means for transferring a blank across the face of the block from one die to another, said means comprising a carrier member, gripping fingers carried thereby, means for oscillating said carrier member across the face of the die block, means for forcing said carrier, during said movement, to move in an arcuate path in a direction transverse to the face of the die block, means for rotating said fingers during said movement, said last-named means comprising spindles rotatably supported by the carrier member on which said fingers are supported, and intermeshing gear segments, one of which is fixed to said spindle and the other being of arcuate form and supported in fixed relation with respect to the frame.

8. In a machine of the character described, a frame, a die block on the frame having a plurality of dies in its face, means for transferring a blank across the face of the block from one die to another, said means comprising a carrier member, gripping fingers carried thereby, means slidably connected to the carrier member for oscillating said carrier member across the face of the die block, means for forcing said carrier, during said movement, to move in an arcuate path in a direction transverse to the face of the die block, said means comprising links pivoted to the frame and to the carrier member, means for rotating said fingers during such movement comprising spindles rotatably supported by the carrier member on which said fingers are supported, a gear segment secured to said spindle, and a second gear segment of arcuate form fixed upon the frame, the teeth of which mesh with those of the gear segment on the spindle during movement of the carrier member.

9. A machine as in claim 1 wherein the gripping fingers are carried by a spindle mounted for rotative and longitudinal movement in the carrier member.

10. A machine as in claim 1 wherein a bushing is mounted in the carrier member, a spindle is mounted for rotative movement within said bushing upon which spindle the gripping fingers are carried, and means are provided for rotating said spindle.

11. In a machine of the character described, a frame, a die block on the frame having a plurality of dies in its face, means for transferring a blank across the face of the block from one die to another, said means comprising a carrier member, gripping fingers carried thereby, means for oscillating said carrier member across the face of the die block, an outer bushing supported in said carrier member, an inner bushing slidably mounted in said outer bushing, means for preventing rotation of said inner bushing relatively to the carrier but permitting longitudinal movement of said inner bushing, a spindle rotatably mounted within said inner bushing upon which said fingers are carried, cooperating stop members on the die block and inner bushing to limit movement of the latter while permitting overtravel of the outer bushing, and cooperating means on said spindle and frame to effect rotation of the spindle during oscillation of the carrier member.

12. A machine as in claim 11 wherein spring means act between said outer and inner bushings to urge the latter in one direction.

13. In a machine of the character described, a frame, a die block on the frame having a plurality of dies in its face, the face of the die being in a substantially vertical plane, means for transferring a blank across the face of the block from one die to another, said means comprising a carrier member, gripping fingers carried thereby, means for oscillating said carrier member across the face of the die block, means for forcing said carrier, during said movement, to move in an arcuate path in a direction transverse to the face of the die block, said means comprising links pivoted to the frame and to the carrier member on substantially vertical axes parallel to the face of the die block, pivot shafts carried by said links, means connecting the carrier member to said pivot shafts for movement of the carrier member longitudinally of the shafts, and means for rotating said fingers during oscillation of the carrier member.

14. In a machine of the character described, a frame, a die block on the frame having a plurality of dies on its face, means for transferring a blank across the face of the block from one die to another, said means comprising a carrier member mounted on the frame for movement across the face of the die block and for movement toward and from said face, means for oscillating said carrier member across the face of the die block, spindles rotatably carried by said carrier member having gripping fingers at their lower ends, a gear carried by each of said spindles, arcuate gear segments mounted on the frame, the teeth of each of which engage with the teeth of one of said gears on the spindles, and means for holding the teeth of the gears on the spindles in meshing engagement with the teeth of the corresponding gear segments on the frame during oscillation of the carrier.

15. In a machine of the character described, a frame, a die block on the frame having a plurality of dies in its face, means for transferring a blank across the face of the block from one die to another, said means comprising a carrier member, spindles rotatably mounted on the carrier having gripping fingers carried thereby, means for moving said carrier member across the face of the die block, said means including rotatable crank members having crank pins thereon extending in a direction transverse to the plane of the face of the die block upon which pins the carrier is slidably mounted to move toward and away from said face, means for simultaneously moving said carrier member on said pins in a direction away from the die block simultaneously with said first-named movement, and means for rotating said fingers during such movement, said last-named means comprising meshing gear members on the frame and spindles respectively.

References Cited in the file of this patent

UNITED STATES PATENTS

| | | |
|---|---|---|
| 1,982,460 | Wilcox | Nov. 27, 1934 |
| 2,689,361 | Schaeffer et al. | Sept. 21, 1954 |
| 2,728,267 | Schaeffer et al. | Dec. 27, 1955 |